(12) United States Patent
Daniel et al.

(10) Patent No.: US 9,351,122 B1
(45) Date of Patent: May 24, 2016

(54) LOCATION GROUPING

(71) Applicant: INTEL CORPORATION, Santa Clara, CA (US)

(72) Inventors: Tomer Daniel, Herzlyia (IL); Jonathan Segev, Tel Mond (IL); Adam Bar Niv, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/581,790

(22) Filed: Dec. 23, 2014

(51) Int. Cl.
*H04W 4/04* (2009.01)
*H04W 4/02* (2009.01)
*H04W 24/10* (2009.01)

(52) U.S. Cl.
CPC ............... *H04W 4/027* (2013.01); *H04W 4/04* (2013.01); *H04W 24/10* (2013.01)

(58) Field of Classification Search
CPC .................................. H04W 4/02; H04W 4/04
USPC ............. 455/440, 456.1, 456.2, 456.3, 456.5, 455/456.6, 457, 41.1
See application file for complete search history.

(56) References Cited

U.S. PATENT DOCUMENTS

| | | | |
|---|---|---|---|
| 2010/0195632 A1* | 8/2010 | Prabhu | H04W 36/32 370/338 |
| 2014/0206382 A1* | 7/2014 | Shabtay | G01S 5/0284 455/456.1 |
| 2015/0049716 A1* | 2/2015 | Gutierrez | H04W 84/12 370/329 |
| 2015/0094103 A1* | 4/2015 | Wang | H04W 4/023 455/456.6 |
| 2015/0264530 A1* | 9/2015 | Prechner | H04W 4/025 455/456.2 |

OTHER PUBLICATIONS http://en.wikipedia.org/wiki/IEEE_802.11u; printed Feb. 26, 2015.
http://standards.ieee.org/findstds/standard/802.11u-2011.html; printed Feb. 26, 2015.

* cited by examiner

*Primary Examiner* — Christopher M Brandt
(74) *Attorney, Agent, or Firm* — Jason H. Vick; Sheridan Ross, PC

(57) ABSTRACT

A device, method and/or system for a wireless communications device with a memory, a processor, and a group management module to receive information indicating a list of communications devices determined to be stationary or quasi-stationary relative to one another and a FTM (Fine Timing Measurement) module adapted to determine location information using the information.

20 Claims, 4 Drawing Sheets

Fig. 2
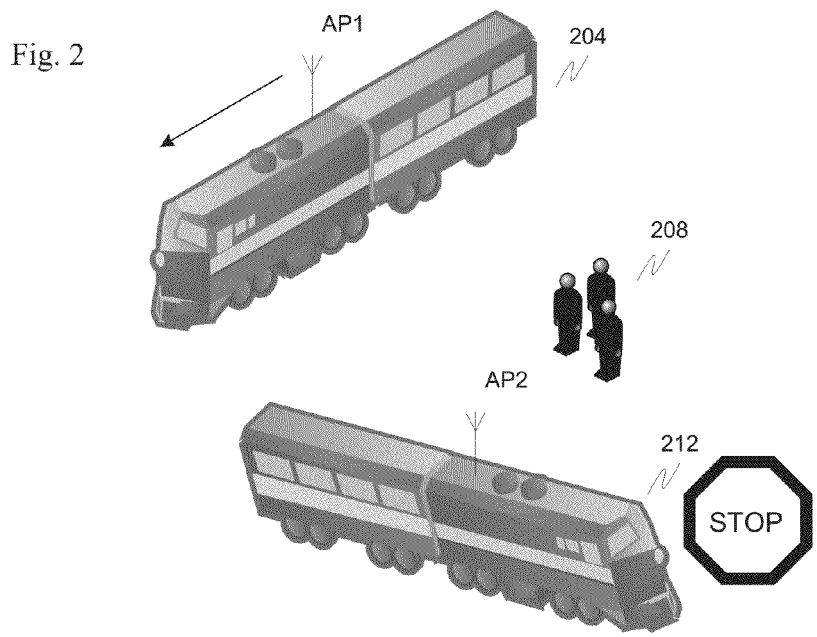
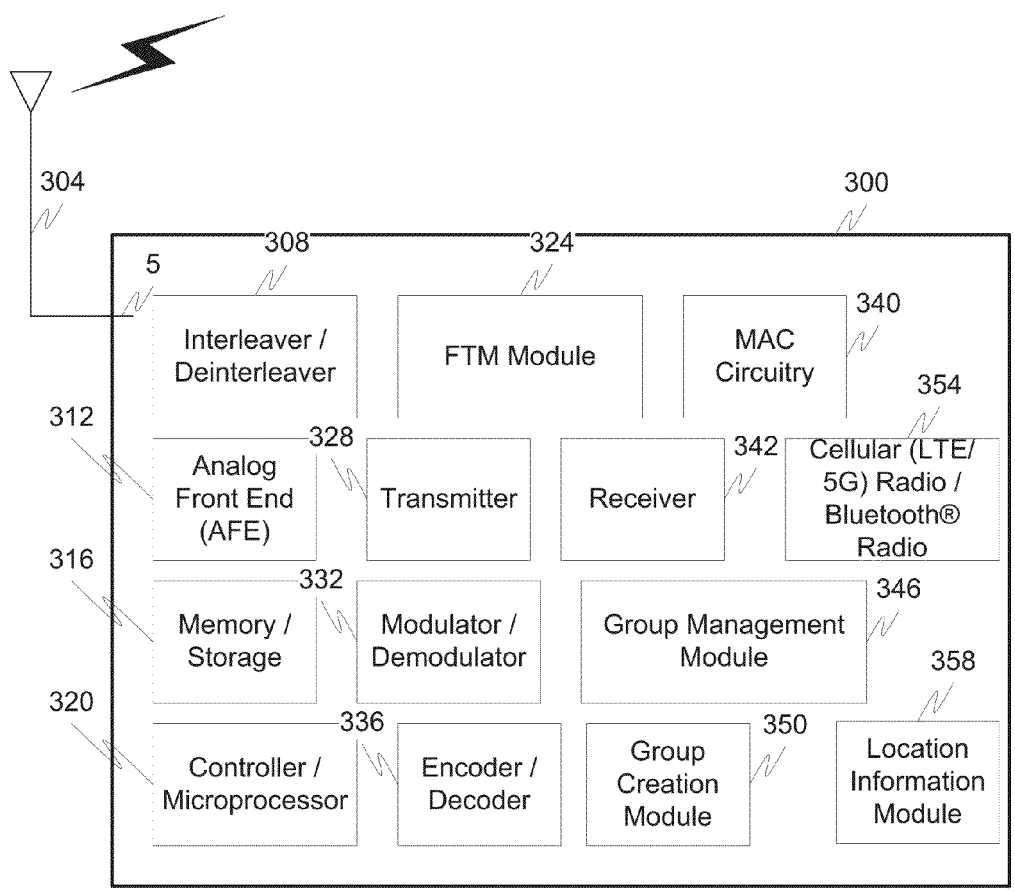
Fig. 3

LOCATION GROUPING

TECHNICAL FIELD

An exemplary aspect is directed toward communications systems. More specifically an exemplary aspect is directed toward wireless communications systems and even more specifically to location determination in wireless communications systems and corresponding device associations.

BACKGROUND

Wireless networks are ubiquitous and are commonplace indoors and becoming more frequently installed outdoors. Wireless networks transmit and receive information utilizing varying techniques. For example, but not by way of limitation, two common and widely adopted techniques used for communication are those that adhere to the Institute for Electronic and Electrical Engineers (IEEE) 802.11 standards such as the 802.11n standard and the IEEE 802.11ac standard.

The 802.11 standard specifies a common Medium Access Control (MAC) Layer which provides a variety of functions that support the operation of 802.11-based wireless LANs (WLANs). The MAC Layer manages and maintains communications between 802.11 stations (such as between radio network cards (NIC) in a PC or other wireless devises or stations (STA) and access points (APs)) by coordinating access to a shared radio channel and utilizing protocols that enhance communications over a wireless medium.

Within these standards, Wi-Fi location certification is based on a fine timing measurement as defined in IEEE 802.11. Details regarding how Fine Timing Measurement (FTM) is performed can at least be found in the following portions of the 802.11 Standard: IEEE P802.11-REVmc/D3.2, September 2014, Part 11: Wireless LAN Medium Access Control—(MAC) and Physical Layer (PHY) Specifications.

In the following detailed description, numerous specific details are set forth in order to provide a thorough understanding of the disclosed techniques. However, it will be understood by those skilled in the art that the presently disclosed techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates and exemplary scenario where a peak in medium activity occurs;

FIG. 3 illustrates an exemplary communications device such as a station (STA) or access point (AP);

DESCRIPTION OF EMBODIMENTS

Figure 1:
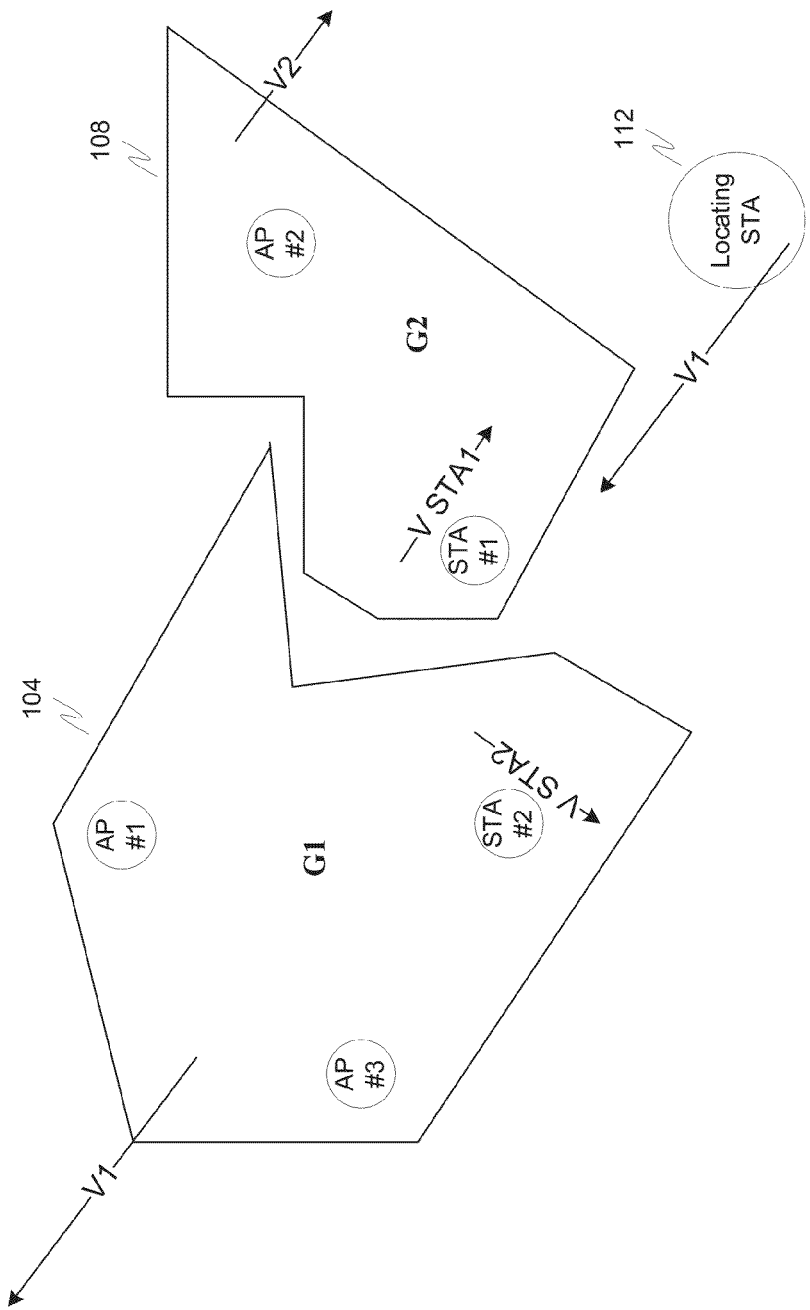
FIG. 1 illustrates an exemplary embodiment with two groups (sets) of AP's and STA's.

The exemplary embodiments herein will be described in relation to communications systems, as well as protocols, techniques, means and methods for performing communications, such as in a wireless network, or in general in any communications network operating using any communications protocol(s). Examples of such are home or access networks, wireless networks, wireless home networks, wireless corporate networks, wireless commercial networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The FTM allows a STA (such as a locating station) to accurately measure the Round Trip Time (RTT) between the STA and another device, such as a STA/AP. With the regular transfer of Fine Timing Measurement frames, it is possible for the recipient STA to track changes in its relative location with other STAs in the environment.

This fine timing measurement procedure enables a station (STA) to perform trilateration to other stations with a known position. However, one disadvantage to the FTM technique is that it incurs a substantial transmission medium overhead due to the need by the client station to perform multiple concurrent procedures (a minimum of four) to perform trilateration.

Moreover, since FTM is performed during the unassociated mode, where link adaptation is inoperative, leading to the usage of the basic rates, FTM usually leads to higher communications medium usage.

One common assumption underlying location determination techniques is that access points (APs) are immobile. However, this assumption is not always correct. For example, consider the scenario where a client is using a smartphone on the subway and is interested in getting guidance to a train car with vacant seats. This client could perform a query, with that query being routed through an access point installed on the train car, an AP in the station, or an AP located on a train moving through the station. The access point located on the train car moving through the station would be moving, and not in range of the client for very long. On the other hand, the AP in the station, or the AP in the train car that is stopped for loading/unloading, would be static or quasi-static in relation to the client.

To assist with a client's connectivity, and to help them find an unoccupied seat, there are certain advantages to having their query routed through the access point that is stationary or quasi-stationary relative to them and their device.

As will be described herein in relation to FIG. 2, when one or more trains arrives at a station, a peak in communications medium activity occurs as many passengers embark or disembark the train. As other trains pass-by, this peak is further burdened with futile attempts to perform FTM with APs placed on the moving train. Similarly, passengers on the moving train trying to establish FTMs with AP's placed in the subway station or on other trains that are stopped at the station momentarily are futile.

One exemplary embodiment attempts to lower such futile FTM procedures as well as lower the medium overhead incurred due to futile FTM procedures. Another exemplary embodiment can be used to assist with the design and implementation of location-aware devices that have a higher performance/lower power consumption and/or a higher responsiveness and can be optimized in silicon and computational power.

In accordance with one exemplary embodiment, the information provided by 802.11 location capable stations, including both access point and/or non-access point stations, is to indicate or otherwise identify a set of devices. This set of devices is identified as having a relative distance that reflects that the set of devices are stationary or quasi-stationary to the device requesting the information.

This can achieved by a device creating a group that the device considers itself to be stationary or quasi-stationary to, relative to other members within that group. For example, FIG. 1 illustrates two groups, designated as G1 104 and G2 108. In addition, there is a locating station 112. Each of the locally relatively stationary groups G1 104 and G2 108 have a respective absolute movement vector designated as V1 and V2. Within each of these groups, G1 104 and G2 108, there can be minor movement vectors (quasi-stationary) stations or access points, such as STA#2 with a minor movement vector of V STA2, and STA#1, with a minor movement vector of V STA1.

In FIG. 1, the G1 group 104 includes three members that are defined as stationary or quasi-stationary to each other: AP#1, AP#3 and STA#2. Group G2 108 similarly includes group members that are defined as stationary or quasi-stationary to each other, those members being: AP#2 and STA#1. In this exemplary scenario, AP#1 created the group G1 104, and AP#2 created the group G2 108. As will be appreciated however, any device is capable of creating groups of stationary or quasi-stationary other devices as discussed herein.

In FIG. 1, the locating station 112 can measure its relative velocity to AP#1, and identify whether AP#1 is stationary, or quasi-stationary to the locating station 112. By the locating station 112 receiving and decoding a list of AP's and stations grouped with AP#1, (with these AP's and STA's being designated as being within G1 104), the locating station 112 can optionally prioritize devices within G1 for range measurement used for location identification, while avoiding G2 (and the devices therein), and thereby dramatically reduce the overhead and latency of identifying which AP's can or should be used for location services.

As shown in FIG. 1, the locating station 112 and the device group G1 104 have similar directions and velocities, thereby making G1 104 stationary or quasi-stationary relative to the locating station 112. This scenario in FIG. 1 can be correlated to a real-world scenario where, for example, a passenger is on a train 204, which has installed access point AP1 (See FIG. 2). This passenger is stationary or quasi-stationary relative to AP1 and therefore that passenger's device should perform FTM measurements with AP1, and any one or more other device(s) that are within an AP1 group.

Similarly, as shown in FIG. 2, it may be futile (and unnecessarily increase medium traffic) to perform FTM procedures with AP2, which is installed on train 212, as AP2 will only be momentarily in the connectivity range of train 204 as it passes by. As discussed above, avoiding FTM attempts with APs installed on train 212 could avoid futile attempts to perform FTM with access points/stations that will only momentarily be available and/or not able to provide location information.

Similarly, the technologies herein optionally recommend that passengers' devices 208 should not attempt to perform FTM's with AP1 on train 204, as AP1 will only momentarily be available, in contrast to AP2, which is installed in train 212, and is stationary or quasi-stationary relative to the people 208 and their devices. Thus, people 208 should use AP2 to perform any FTMs and thereby perhaps find an open seat on train 212.

FIG. 3 outlines exemplary componentry associated with a device, such as a station, locating station or access point 300. In particular, the componentry includes one or more antenna 304, and interleaver/deinterleaver 308, an analog front end 312, memory/storage 316, controller/microprocessor 320, an FTM module 324, transmitter 328, modulator/demodulator 332, encoder/decoder 336, MAC circuitry 340, receiver 342, a group management module 346, a group creation module 350, a radio/Bluetooth® module 354, and a location information module 358, all interconnected by one or more links (not shown). In addition, the device 300 can include other conventional and well known componentry which has been omitted for clarity.

The device 300 can have one more antennas 304, for use in wireless communications such as WiFi, multi-input multi-output (MIMO) communications, Bluetooth®, etc. The antennas 304 can include, but are not limited to, directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 304 generally interact with an Analog Front End (AFE) 312, which is needed to enable the correct processing of the received modulated signal. The AFE 312 can be positioned between the antenna 304 and a digital baseband system in order to convert the analog signal into a digital signal for processing.

The device 300 can also include a controller/microprocessor 320 and a memory/storage 316. The device 300 can interact with the memory/storage 316 which may store information and operations necessary for configuring and transmitting or receiving the information described herein in addition to other data. The memory/storage 316 may also be used in connection with the execution of application programming or instructions by the controller/microprocessor 320, and for temporary or long term storage of program instructions and/or data. As examples, the memory/storage 320 may comprise a computer-readable device, RAM, ROM, DRAM, SDRAM and/or other storage devices and media.

The controller/microprocessor 320 may comprise a general purpose programmable processor or controller for executing application programming or instructions related to the device 300. Further, controller/microprocessor 320 can perform operations for configuring and transmitting information as described herein. The controller/microprocessor 320 may include multiple processor cores, and/or implement multiple virtual processors. Optionally, the controller/microprocessor 320 may include multiple physical processors. By way of example, the controller/microprocessor 220 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The device 300 can further include a transmitter 328 and receiver 342 which can transmit and receive signals, respectively, to and from other wireless devices or access points using one or more of the antennas 304. Included in the device 300 circuitry is the medium access control or MAC Circuitry 340. MAC circuitry 340 provides the medium for controlling access to the wireless medium. In an exemplary embodiment, the MAC circuitry 340 may be arranged to contend for the wireless medium and configure frames or packets for communication over the wireless medium.

The device 300 can also optionally contain a security module (not shown). This security module can contain information regarding but not limited to, security parameters required to connect the wireless device to an access point or other device or other available network(s), and can include WEP or WPA security access keys, network keys, etc. The WEP security access key is a security password used by Wi-Fi networks. Knowledge of this code will enable the wireless device to exchange information with the access point. The information exchange can occur through encoded messages with the WEP access code often being chosen by the network administrator. WPA is an added security standard that is also used in conjunction with network connectivity with stronger encryption than WEP.

In operation, and assuming the device 300 is not already part of a group, an optional exemplary embodiment has the group creation module 350, in cooperation with memory 316 and controller 320, perform a query to one or more other devices within range, to determine whether one or more of those other devices are one or more of already a part of a group, or are stationary or quasi-stationary relative to the device 300. This initial step establishes the groups by a device such as AP#1, such as G1 and G2 illustrated in FIG. 1. As discussed, this can be based on, for example, a threshold, and information, such as vector and velocity information, regarding the relative movements of the devices to one another. Once it is determined that certain other devices are stationary or quasi-stationary relative to the device making the query, then a group(s) can be identified and information regarding the members of the group communicated to all members of the group.

However, it is to be appreciated that while the exemplary embodiments will be discussed in relation to a device being part of one group, it should be appreciated that a device, such as device 300, could be affiliated with more than one group. Moreover, groups themselves can be members (or sub members) of other groups.

Alternatively, or in addition, the designation of device(s) as being part of a group can be based on a profile that, for example, define criteria outlining whether another device is stationary or quasi-stationary relative to the device making the query, e.g., the locating station, and/or based on a configuration setting or user setting. For example, a system administrator, knowing the installed location of devices, could configure certain devices to be within one or more groups. Similarly, devices could include an automatic grouping feature such that based on GPS location information and/or vector and velocity information, devices could automatically create, maintain and update group information.

If one or more of these criteria/profiles are met, the group creation module 350, cooperating with the group management module 346, can create a group of the other stations/access points that are determined to be stationary or quasi-stationary relative to the device 300. As is to be appreciated, this grouping information can be updated on a predetermined or other interval to help ensure accuracy and consistency of the group information. The updating can be performed based on an instruction originating from the group management module 346, in which case the device 300 can confirm that its position is stationary or quasi-stationary relative to the other identified members of the group. If determined that another device is not stationary or quasi-stationary relative to the other identified members of the group, that device can be removed from the group and the updated group information stored in the group management module 346.

As discussed, this determination of location relative to other members can be performed based on a fine timing measurement, in cooperation with the FTM module 324, as discussed in the IEEE 802.11 standard using trilateration to one or more other stations or devices.

Once the various APs/STAs supporting location have established their group information, and the group information stored in the group management module, and in accordance with one exemplary embodiment, a locating station can scan for surrounding access points that support location to obtain this saved group information and therefore the set of devices that are in the group.

This can be performed in cooperation with the location information module 358 and, in cooperation with the FTM module 324, the locating station performs queries one or more APs as to whether the APs support location. As part of the negotiation process, the locating station obtains the list of group members maintained on the access point of the other access points or stations within the group—it is these stations that the locating station can use for location determination.

Next, the locating station determines with the cooperation of the FTM module 324 whether the relative velocity between the locating station and the AP is too high. If the relative velocity is not too high, the AP is determined to be immobile or quasi-immobile relative to the locating station.

When the relative velocity between the locating station and the AP is too high, the AP is determined to be mobile relative to the locating station and not appropriate for FTM measurements.

When the relative velocity is not too high, a determination is then made by the location information module 358 what identified access point(s)/station(s) from the received list that are within the group is/are adequate for navigation. The locating station can ignore other access points, or stations don't appear within the received list and only initiate FTMs to the devices within the list.

As discussed, any device may create the list based on measurements taken by itself to other devices, and in the case of an AP station capable of location or proximity or an IOT (Internet of Things) device, providing location services based on range. These measurements can be readily available and do not require additional medium usage. As will be appreciated, this proximity information can be determined one or more of manually, based on Doppler information, by looking at location delta information, and/or dynamically determined as is known.

By performing group sharing step based on the list received that contains the members of a group, devices are no longer required to poll each and every other device within range to identify relative movement with respect to the other station/access points. By sharing group information as discussed herein, one exemplary advantage is that it prevents futile FTM negotiation and execution, thereby reducing medium usage at its peak. Additionally, it improves responsiveness as the time to acquire to stationary or quasi-stationary APs and STAs is shortened.

In addition, an exemplary embodiment of the technique reduces power consumption as a smaller number of FTM's are needed, and the medium becomes less crowded, thereby reducing collisions and listen time prior to any transmission.

Figure 4:
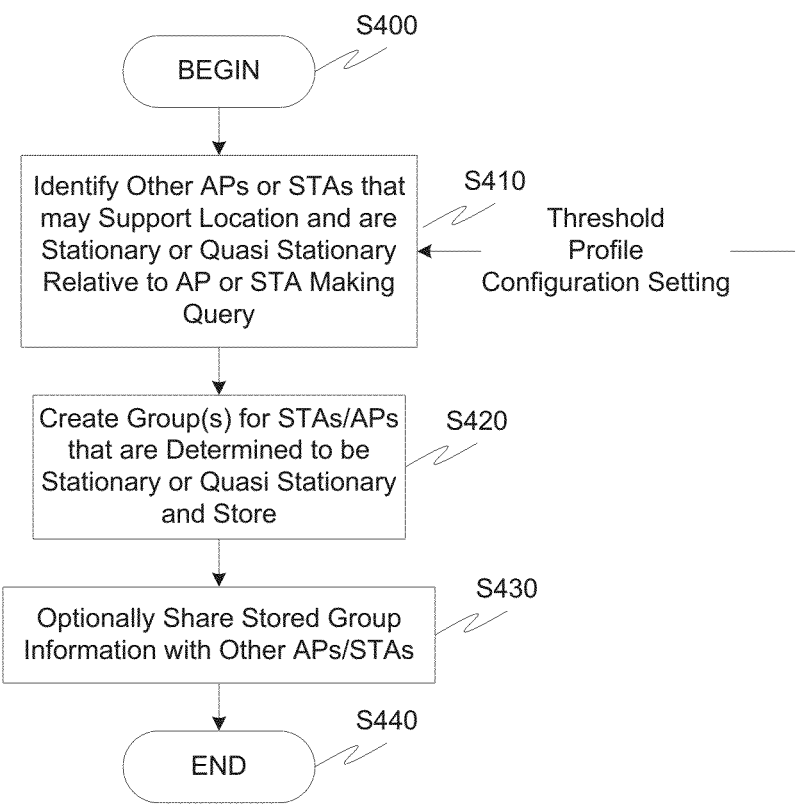
FIG. 4 is a flowchart outlining and exemplary method for performing station and/or access point grouping.

FIG. 4 outlines an exemplary method of establishing a group. In particular, control begins in step S400 and continues to step S410. In step S410, one or more access points and/or stations that are stationary or quasi stationary relative to the access point or station making a query are identified. As discussed, this can be based on one or more of threshold information, profile information, configuration settings, Doppler information, distance delta information, and/or manually or dynamically configured.

Next, in step S420, a group is created for the stations and/or access points that are determined to be stationary or quasi-stationary to the device making the query, with these identified devices being associated with a group identifier. As discussed, this group identifier, and/or a list of stations/access points, can then be stored and shared with one or more other devices, as discussed herein, with the group representing devices that are stationary or quasi-stationary relative to one another. Control then continues to step S440 where the control sequence ends.

Figure 5:
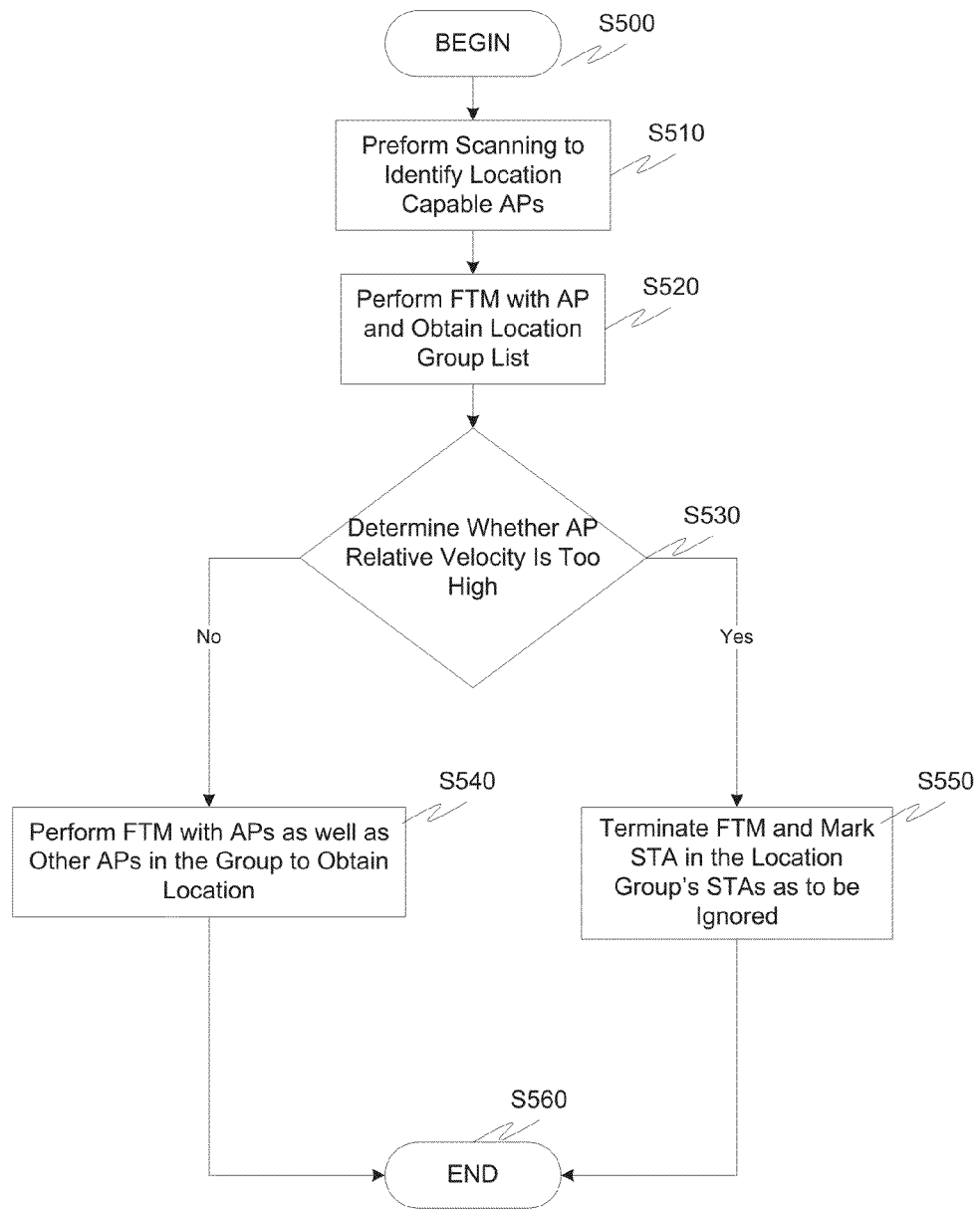
FIG. 5 is a flowchart outlining an exemplary method for performing FTM.

FIG. 5 outlines an exemplary method for determining stationary or quasi-stationary groups relative to a device. In particular, control begins at step S500 and continued to step S510. In step S510, a scan is performed to identify a location capable access point(s). Next, in step S520, FTM is performed with the identified access point and a group list obtained. As discussed, this group list can include identifiers of one or more access points and stations within the group that have been determined to be stationary or quasi-stationary to the location capable access point. Control then continues to step S530.

In step S530, determination is made whether the identified access point has a relative velocity that is too high with respect to the querying device. If the relative velocity is not too high, control continues to step S540 with control otherwise jumping to step S550.

In step S540, FTM is performed with the identified AP, as well as one or more other AP's/stations in the group to obtain location information for the querying device. Control then continues to step S560 where the control sequence ends.

If the relative velocity is too high, control continues to step S550 where the FTM service can be terminated to that device, and station/access points within the obtained location group list are marked as to be ignored, thereby achieving the exemplary advantages discussed herein. Control then continues to step S560 where the control sequence ends.

In accordance with another exemplary embodiment, the dissemination of the location group list as shown in step S520 could be shared only after determining whether the relative velocity of the identified access point is not too high. One advantage to this technique is it saves further overhead and communication time on the medium.

In accordance with another exemplary embodiment, techniques are disclosed herein for a mechanism which provides a list of nearby stations which are relatively stationary, stationary or quasi-stationary with respect to each other. Only devices within this list are used to determine location information for a station attempting to determine its location.

In accordance with another exemplary embodiment, a device, which has received the list of devices which are relatively stationary or quasi-stationary with respect to each other, attempts FTM one or more other devices within that set or to other accessible devices so as to confirm or refine the members identified as being in the group. For example, if a device identified as being in the group is no longer accessible, that device can be removed from the group. As is to be appreciated, this operation can be performed manually, automatically, dynamically, and/or in general using any technique that is capable of determining whether one device is static or quasi-static, distance wise, to another device. As will further be appreciated, these movement thresholds can be indicated within the group list and can be shared with one or more other devices.

In accordance with one exemplary embodiment, this sharing is accomplished using an ANQP GAS query. More specifically, the Access Network Query Protocol (ANQP) and Generic Advisement Set (GAS) are specified as part of the 802.11u amendment, and provide a means to communicate meta data useful in a mobile device's network selection process. Additional details regarding the ANQP GAS query can be found at: en.wikipedia.org/wiki/IEEE_802.11u and standards.ieee.org/findstds/standard/802.11u-2011.html. Thus, the list of devices within a group can be shared using the ANQP GAS query.

The exemplary embodiments are described in relation to making location determination more efficient in a wireless environment. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to 802.11 transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:
A wireless communications device comprising:
a memory;
a processor; and
a group management module adapted to receive information indicating a list of communications devices determined to be stationary or quasi-stationary relative to one another; and
a FTM (Fine Timing Measurement) module adapted to determine location information using the information.

Any one or more of the above aspects, wherein the list of communication devices is received as part of a ANQP (Access Network Query Protocol) and GAS (Generic Advisement Set) query.

Any one or more of the above aspects, further comprising a group creation module adapted to determine at least one additional list of communication devices that are stationary or quasi-stationary relative to one another.

Any one or more of the above aspects, wherein the group creation module is adapted to manually, automatically or based on a profile create the at least one additional list of communication devices that are stationary or quasi-stationary relative to one another.

Any one or more of the above aspects, wherein the FTM module is further adapted to measure whether devices in the list of communication devices are stationary or quasi-stationary relative to one another.

Any one or more of the above aspects, wherein the information also includes relative movement information for one or more of the communication devices.

Any one or more of the above aspects, wherein the wireless communications device is adapted to avoid performing FTM with communications devices that are not identified in the information.

Any one or more of the above aspects, wherein a location determination module is adapted to make a relative velocity determination regarding the communications device to another communications device.

Any one or more of the above aspects, wherein the group management module is further adapted to communicate the information to one or more additional communications devices. Any one or more of the above aspects, further comprising storage, one or more antennas, and MAC (Media Access Control) circuitry.

A method comprising:
receiving information indicating a list of communications devices determined to be stationary or quasi-stationary relative to one another; and
determining, by a wireless communications device, location information using the information.

Any one or more of the above aspects, wherein the list of communication devices is received as part of a ANQP (Access Network Query Protocol) and GAS (Generic Advisement Set) query.

Any one or more of the above aspects, further comprising determining at least one additional list of communication devices that are stationary or quasi-stationary relative to one another.

Any one or more of the above aspects, further comprising manually, automatically or based on a profile creating the at least one additional list of communication devices that are stationary or quasi-stationary relative to one another.

Any one or more of the above aspects, further comprising measuring whether devices in the list of communication devices are stationary or quasi-stationary relative to one another.

Any one or more of the above aspects, wherein the information also includes relative movement information for one or more of the communication devices.

Any one or more of the above aspects, wherein the wireless communications device is adapted to avoid performing FTM with communications devices that are not identified in the information.

Any one or more of the above aspects, further comprising making a relative velocity determination regarding the communications device to another communications device.

Any one or more of the above aspects, further comprising sharing the information with one or more additional communications devices.

Any one or more of the above aspects, further comprising storing the information.

A system comprising:

means for receiving information indicating a list of communications devices determined to be stationary or quasi-stationary relative to one another; and means for determining, by a wireless communications device, location information using the information.

Any one or more of the above aspects, wherein the list of communication devices is received as part of a ANQP (Access Network Query Protocol) and GAS (Generic Advisement Set) query.

Any one or more of the above aspects, further comprising means for determining at least one additional list of communication devices that are stationary or quasi-stationary relative to one another.

Any one or more of the above aspects, further comprising means for manually, automatically or based on a profile creating the at least one additional list of communication devices that are stationary or quasi-stationary relative to one another.

Any one or more of the above aspects, further comprising means for measuring whether devices in the list of communication devices are stationary or quasi-stationary relative to one another.

Any one or more of the above aspects, wherein the information also includes relative movement information for one or more of the communication devices.

Any one or more of the above aspects, wherein the wireless communications device is adapted to avoid performing FTM with communications devices that are not identified in the information.

Any one or more of the above aspects, further comprising making a relative velocity determination regarding the communications device to another communications device.

Any one or more of the above aspects, further comprising means for sharing the information with one or more additional communications devices.

Any one or more of the above aspects, further comprising means for storing the information.

A non-transitory computer readable information storage media having stored thereon instructions, that when executed by a processor, perform a method comprising:

receiving information indicating a list of communications devices determined to be stationary or quasi-stationary relative to one another; and determining, by a wireless communications device, location information using the information.

Any one or more of the above aspects, wherein the list of communication devices is received as part of a ANQP (Access Network Query Protocol) and GAS (Generic Advisement Set) query.

Any one or more of the above aspects, further comprising determining at least one additional list of communication devices that are stationary or quasi-stationary relative to one another.

Any one or more of the above aspects, further comprising manually, automatically or based on a profile creating the at least one additional list of communication devices that are stationary or quasi-stationary relative to one another.

Any one or more of the above aspects, further comprising measuring whether devices in the list of communication devices are stationary or quasi-stationary relative to one another.

Any one or more of the above aspects, wherein the information also includes relative movement information for one or more of the communication devices.

Any one or more of the above aspects, wherein the wireless communications device is adapted to avoid performing FTM with communications devices that are not identified in the information.

Any one or more of the above aspects, further comprising making a relative velocity determination regarding the communications device to another communications device.

Any one or more of the above aspects, further comprising sharing the information with one or more additional communications devices.

Any one or more of the above aspects, further comprising storing the information.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s) 5, connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for location determination. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a memory;
a processor; and
a group management module adapted to receive information from a location capable access point indicating a list of communications devices determined to be stationary or quasi-stationary relative to one another and the location capable access point; and
a FTM (Fine Timing Measurement) module adapted to determine, using the information, location information for the location capable access point only when a relative velocity between the wireless communications device and location capable access point is below a threshold.

2. The device of claim 1, wherein the list of communication devices is received as part of a ANQP (Access Network Query Protocol) and GAS (Generic Advisement Set) query.

3. The device of claim 1, further comprising a group creation module adapted to determine at least one additional list of communication devices that are stationary or quasi-stationary relative to one another.

4. The device of claim 3, wherein the group creation module is adapted to manually, automatically or based on a profile create the at least one additional list of communication devices that are stationary or quasi-stationary relative to one another.

5. The device of claim 1, wherein the FTM module is further adapted to measure whether devices in the list of communication devices are stationary or quasi-stationary relative to one another.

6. The device of claim 1, wherein the information also includes relative movement information for one or more of the communication devices.

7. The device of claim 1, wherein the wireless communications device is adapted to avoid performing FTM with communications devices that are not identified in the information.

8. The device of claim 1, wherein a location determination module is adapted to make a relative velocity determination regarding the communications device to another communications device.

9. The device of claim 1, wherein the group management module is further adapted to communicate the information to one or more additional communications devices.

10. The device of claim 1, further comprising storage, one or more antennas, and MAC (Media Access Control) circuitry.

11. A method comprising:
    receiving information from a location capable access point indicating a list of communications devices determined to be stationary or quasi-stationary relative to one another and the location capable access point; and
    determining, by a wireless communications device using the information, location information for the location capable access point only when a relative velocity between the wireless communications device and location capable access point is below a threshold.

12. The method of claim 11, wherein the list of communication devices is received as part of a ANQP (Access Network Query Protocol) and GAS (Generic Advisement Set) query.

13. The method of claim 11, further comprising determining at least one additional list of communication devices that are stationary or quasi-stationary relative to one another.

14. The method of claim 13, further comprising manually, automatically or based on a profile creating the at least one additional list of communication devices that are stationary or quasi-stationary relative to one another.

15. The method of claim 11, further comprising measuring whether devices in the list of communication devices are stationary or quasi-stationary relative to one another.

16. The method of claim 11, wherein the information also includes relative movement information for one or more of the communication devices.

17. The method of claim 11, wherein the wireless communications device is adapted to avoid performing FTM with communications devices that are not identified in the information.

18. The method of claim 11, further comprising making a relative velocity determination regarding the communications device to another communications device.

19. The method of claim 11, further comprising sharing the information with one or more additional communications devices.

20. The method of claim 11, further comprising storing the information.

\* \* \* \* \*